(No Model.)

E. M. SCHUMACHER.
HEN'S NEST.

No. 380,699. Patented Apr. 10, 1888.

Witnesses
H. L. Gill
N. B. Corwin

Inventor.
Emil M. Schumacher.
by W. Bakewell & Son
his Attorneys.

UNITED STATES PATENT OFFICE.

EMIL M. SCHUMACHER, OF WEST VIEW, PENNSYLVANIA.

HEN'S NEST.

SPECIFICATION forming part of Letters Patent No. 380,699, dated April 10, 1888.

Application filed December 16, 1887. Serial No. 258,117. (No model.)

*To all whom it may concern:*

Be it known that I, EMIL M. SCHUMACHER, of West View, in the county of Allegheny and State of Pennsylvania, have invented a new and useful Improvement in Hens' Nests; and I do hereby declare the following to be a full, clear, and exact description thereof, reference being had to the accompanying drawings, forming part of this specification, in which—

Figure 1:
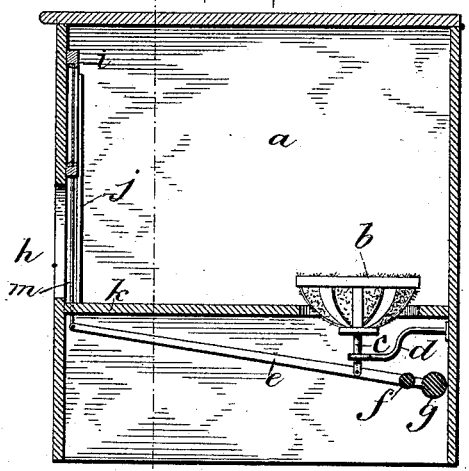
Figure 2:
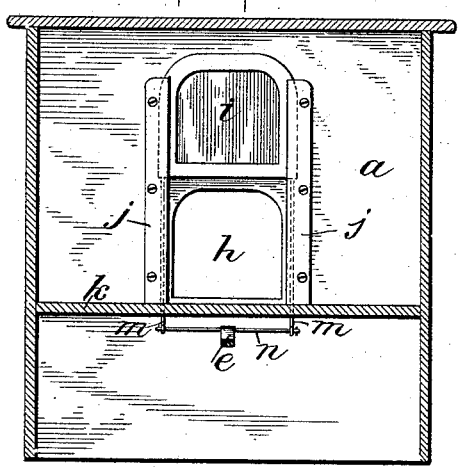
Figure 3:
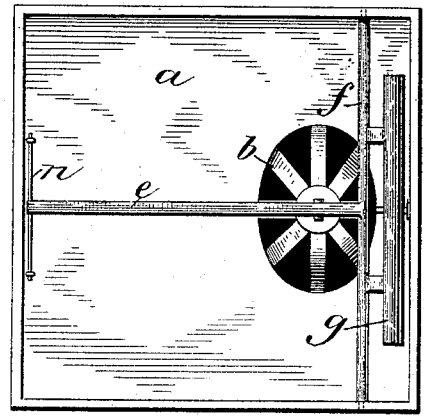

Figure 1 is a vertical sectional view of my improved hen's nest. Fig. 2 is a section of the same on the line $x\ x$ of Fig. 1. Fig. 3 is a plan view of the bottom of the nest.

Like letters of reference indicate like parts wherever they occur.

My invention relates to an improvement in that class of hens' nests in which the nest is provided with devices operated by the weight of the hen upon the nest, so as to inclose the hen and prevent access of other fowls or animals to the nest. The mechanism is also arranged so that when the hen leaves the nest a door shall open and permit free exit. There have been a number of different apparatus devised for this general purpose; but heretofore none of them has come into general use, because either they have been so complicated in their structure as to be unduly expensive and difficult to keep in order or because the mechanism has been so imperfect as to prevent its successful operation. I have therefore devised my improvement, the object being to afford a cheap simple construction which will be within the reach of ordinary farmers, and which in its operation will not be liable to injure or alarm the hens.

I will now describe my invention, so that others skilled in the art may manufacture and use the same.

In the drawings, $a$ represents a box within which the nest is inclosed, and $b$ is the nest, which consists, preferably, of a light bowl-shaped basket or frame filled with hay or other suitable material. Projecting from the bottom of the nest and fixed thereto is a rod or stem, $c$, which passes through a socket or bearing in the guide-arm $d$, one end of which is secured to the side of the box $a$. The free end of the rod $c$ is pivoted to the long arm of the lever $e$, which lever is journaled or pivoted by the cross-bar $f$ to the side of the box $a$. Extending from the bar $f$ is the weight $g$, which forms the short arm of the lever. The box or case $a$ has at its front a doorway, $h$, through which the hen may enter the nest. This doorway is provided with a light vertically-sliding door, $i$, arranged in vertical slides or grooves $j$, situate at the sides of the doorway. Extending down from the bottom of the door $i$, through the floor or partition $k$ in the box $a$, are two rods, $m\ m$, which are joined by the cross-rod $n$ below the floor $k$, to which cross-rod the free end of the long arm of the lever $e$ is pivoted.

The operation of the device is as follows: The hen enters the doorway $h$ on her way to the nest, and when she reaches the nest and steps upon it her weight causes it to descend, thereby throwing down the long end of the lever $e$, which, by means of the rods $m\ m$, closes the door $i$. Owing to the sliding rod $c$ being attached to the long arm of the lever $e$ near its pivotal point, but a slight movement of the nest is requisite to move the end of the lever a sufficient distance to close the door, and as the movement of the door and lever is noiseless, and as the operative parts are removed from sight of the hen below the nest, there is nothing in the operation of the nest to cause alarm to the hen or to induce her to leave the nest. When the hen rises from the nest and steps to the floor $k$, the weight $g$ causes the short arm of the lever to descend and the nest and long arm of the lever to rise, which again opens the door $i$ and retains it in its normal position. By increasing or decreasing the weight $g$, or by altering its position, the weight or pressure requisite to depress the nest may be regulated so that but a slight weight will be sufficient to operate the door-closing mechanism.

The advantages of my improvement are, that the door is operated in both directions by a positive movement, that the devices may be so constructed as to operate noiselessly and with a minimum movement of the nest, and that the mechanism is simple, being composed of the fewest possible parts, and is efficient and not liable to get out of order.

I am aware of Letters Patent No. 294,974, granted to J. B. Dillon on March 11, 1884, and I do not desire to claim the combination of devices therein shown and described.

Having thus described my invention, what I claim, and desire to secure by Letters Patent, is—

In a hen's nest, the combination of a pivoted weighted lever situate below the nest, a nest mounted on the lever, and a sliding door connected by a positive connection with the lever, whereby the door is operated positively by movement of the nest, substantially as and for the purposes described.

In testimony whereof I have hereunto set my hand this 12th day of December, A. D. 1887.

EMIL M. SCHUMACHER.

Witnesses:
W. B. CORWIN,
J. K. SMITH.